United States Patent
Podilchuk

(10) Patent No.: US 8,027,543 B2
(45) Date of Patent: Sep. 27, 2011

(54) METHOD AND SYSTEM FOR SEARCHING A DATABASE OF GRAPHICAL DATA

(75) Inventor: Christine Podilchuk, Warren, NJ (US)

(73) Assignee: D&S Consultants, Inc., Eatontown, NJ (US)

(*) Notice: Subject to any disclaimer, the term of this patent is extended or adjusted under 35 U.S.C. 154(b) by 0 days.

(21) Appl. No.: 12/829,411

(22) Filed: Jul. 2, 2010

(65) Prior Publication Data

US 2010/0268737 A1    Oct. 21, 2010

Related U.S. Application Data

(63) Continuation of application No. 11/950,365, filed on Dec. 4, 2007, now Pat. No. 7,773,811.

(60) Provisional application No. 60/873,179, filed on Dec. 6, 2006.

(51) Int. Cl.
*G06K 9/00* (2006.01)

(52) U.S. Cl. ............ 382/209; 382/160; 382/305
(58) Field of Classification Search .......... 382/159–160, 382/181–209, 305–307
See application file for complete search history.

(56) References Cited

U.S. PATENT DOCUMENTS 7,065,521 B2 *   6/2006   Li et al. .................... 1/1
7,246,314 B2 *   7/2007   Foote et al. ............... 715/700

* cited by examiner

*Primary Examiner* — Wesley Tucker
(74) *Attorney, Agent, or Firm* — Dennis M. Carleton; Fox Rothschild LLP

(57) ABSTRACT

A method and system for searching a database of graphical data are described. Embodiments of the invention use accelerated image-comparing techniques based on an adaptation of the Levenshtein algorithm for matching or searching one-dimensional data strings for use with recognizing pre-selected targets in graphical contents of 2D images.

19 Claims, 4 Drawing Sheets

METHOD AND SYSTEM FOR SEARCHING A DATABASE OF GRAPHICAL DATA

CROSS-REFERENCE TO RELATED APPLICATIONS

This application is a continuation of U.S. patent application Ser. No. 11/950,365, filed on Dec. 5, 2007, which claims the benefit of U.S. provisional patent application Ser. No. 60/873,179, filed on Dec. 6, 2006, which is herein incorporated by reference in its entirety, and U.S. non-provisional patent application Ser. No. 11/619,104, filed on Jan. 2, 2007, which is incorporated herein by reference in its entirety.

FIELD OF THE INVENTION

The present invention relates generally to the field of techniques for analyzing graphical data and, in particular, methods and systems for computerized searching databases of 2D images.

BACKGROUND OF THE INVENTION

Recognition of objects of interest (referred to herein as "targets") in graphical contents of 2D images is used by military, law enforcement, commercial, and private entities. Typically, the goal of target recognition is identification or monitoring of one or more targets depicted in images produced by surveillance apparatuses or images stored in respective databases or archives. In various applications, target recognition may be performed in real time or, alternatively, using pre-recorded data.

It has been recognized in the art that there are difficulties associated with computerized, i.e., automated, comparing of the graphical contents of images. In particular, many challenges in the field of computerized target recognition relate to identification of targets that change their appearance due to orientation, lighting conditions, or partial occlusions.

Despite the considerable effort in the art devoted to techniques for searching databases of graphical data, further improvements would be desirable.

SUMMARY OF THE INVENTION

One aspect of the invention provides a method for searching a database of graphical data, such as pre-stored reference images. The method is directed to determining a degree of similarity between a query image and the reference images based on a similarity score between the images, wherein the similarity score is defined as a complement to a pictorial edit distance, which is asserted as a weighted sum of a 2D representation of Insertion, Deletion, and Substitution Error terms of the Levenshtein algorithm for matching or searching one-dimensional data strings.

In one embodiment, the method includes generating a matrix of similarity scores of the reference images, in which the similarity scores of each reference image versus itself is a diagonal matrix element and similarity scores of each reference image versus all other reference images are non-diagonal matrix elements, and determining similarity scores of a query image versus a selected reference image.

If a similarity score between the query image and the selected reference image is greater than a pre-selected threshold, the method determines that the query image and reference images match, or that the objects depicted in the query image and the reference image match, otherwise the method rejects the reference image and excludes it from further consideration and selects another reference image by selecting the reference image having the closest similarity score to the similarity score between the rejected reference image and the query image.

The method continues cycling in this manner until a reference image is found having a similarity score with the query image which exceeds the pre-selected threshold, or until a pre-determined number of reference images have been compared with the query image, in which case it is possible that no match is identified.

Another aspect of the present invention provides a system using the inventive method for searching a database of graphical data.

Various other aspects and embodiments of the invention are described in further detail below.

This Summary is neither intended nor should it be construed as being representative of the full extent and scope of the present invention, which these and additional aspects will become more readily apparent from the detailed description, particularly when taken together with the appended drawings.

Figure 1:
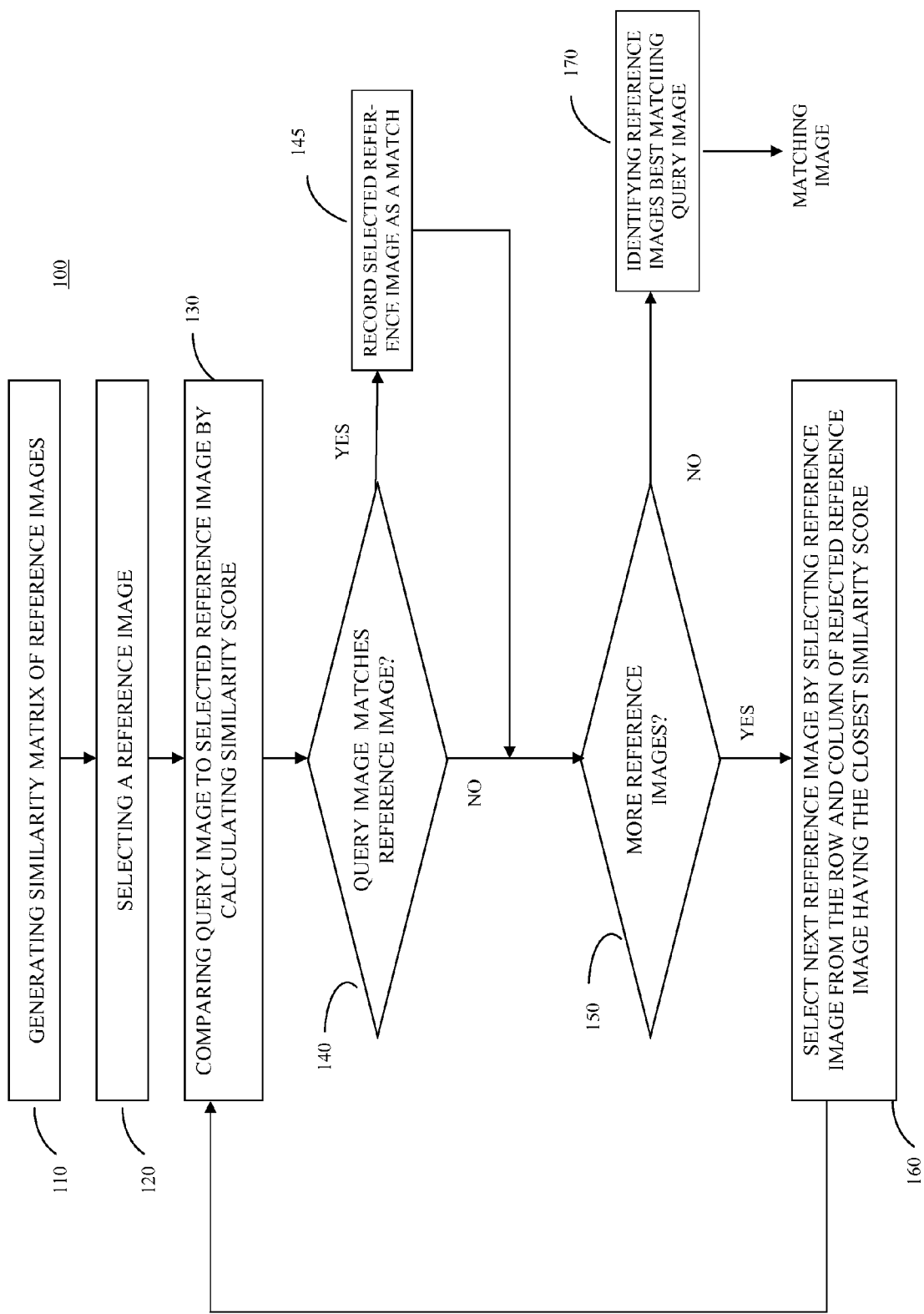
FIG. 1 is a flow diagram illustrating a method for searching a database of graphical data in accordance with one embodiment of the present invention.

To facilitate understanding, identical reference numerals have been used, where possible, to designate similar elements that are common to the figures, except that suffixes may be added, when appropriate, to differentiate like elements. The images in the drawings are simplified for illustrative purposes and have not necessarily been drawn to scale.

The appended drawings illustrate exemplary embodiments of the invention and, as such, should not be considered as limiting the scope of the invention that may admit to other equally effective embodiments. It is contemplated that features or steps of one embodiment may beneficially be incorporated in other embodiments without further recitation.

DETAILED DESCRIPTION

Figure 2:
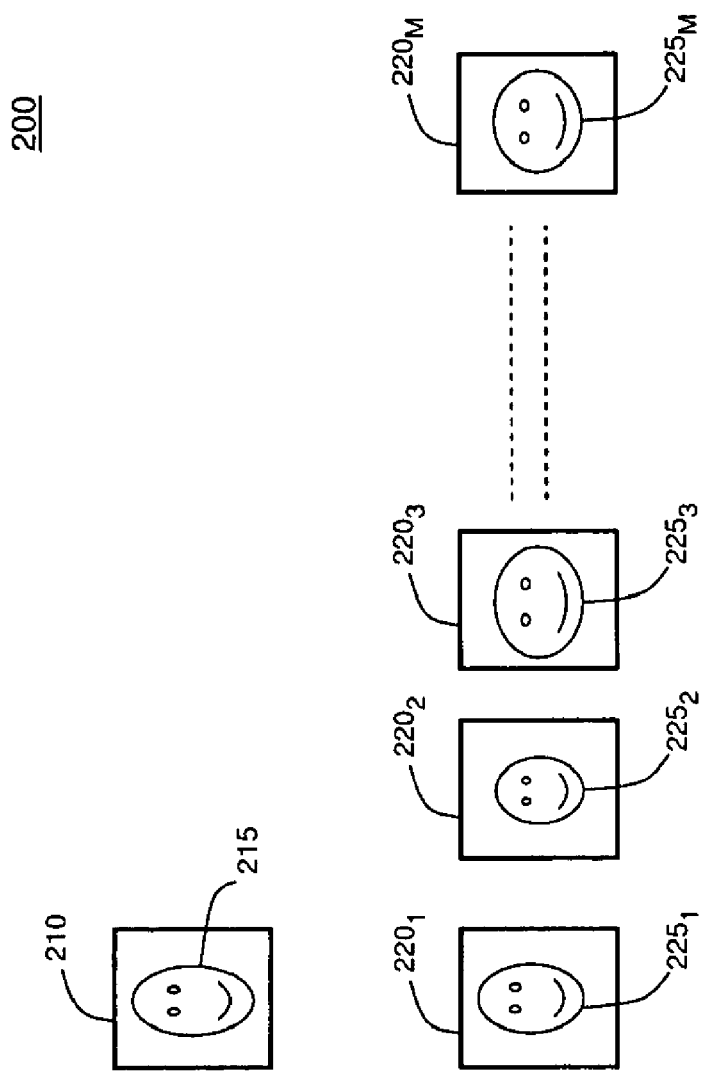
FIG. 2 is a schematic diagram depicting exemplary images compared using the method of FIG. 1.
Figure 3:
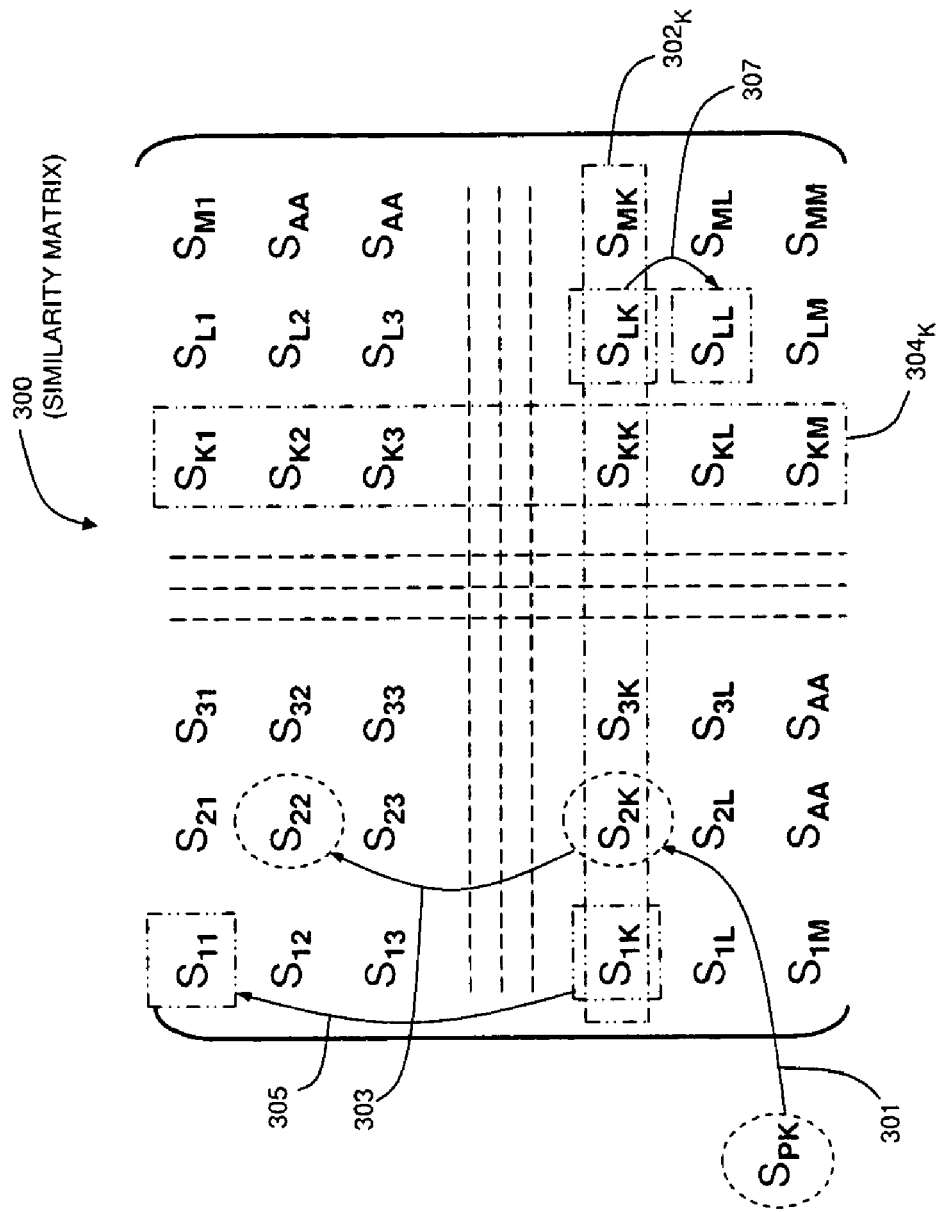
FIG. 3 is a schematic diagram illustrating the method of FIG. 1.

Referring to the figures, FIG. 1 depicts a flow diagram illustrating a method 100 for searching a database of graphical data in accordance with one embodiment of the present invention, and FIGS. 2-3 depict schematic diagrams 200 and 300 illustrating the method 100. To best understand the invention, the reader should refer to FIGS. 1-3 simultaneously.

In various embodiments, method steps of the method 100 are performed in the depicted order or at least two of these steps or portions thereof may be performed contemporaneously, in parallel, or in a different order. Those skilled in the art will readily appreciate that the order of executing at least a portion of other discussed below processes or routines may also be modified.

Aspects of the present invention are illustratively described below within the context of images depicting live objects such as humans or body parts thereof. The invention may also be utilized within context of images depicting material objects, such as missiles or their plumes, vehicles, objects floating in air, free space, or liquid, beams of light, and the like, as well as images depicting a combination of various live or material objects. It has been contemplated and is within the scope of the invention that the method 100 is utilized within the context of such images.

Referring to FIG. 2, a 2D image 210 (referred to hereafter as a "query image") and a plurality of M pre-stored 2D images 220 (referred to hereafter as a "reference images") are provided, where M is an integer. In one embodiment, the reference images 220 are stored in a database of a computerized system or apparatus for comparing images (discussed below in reference to FIG. 4).

Illustratively, each of the reference images 220 depicts a respective object 225, which is compared to a target 215 depicted in the query image 210. Generally, the target 215 and objects 225 are depicted surrounded by live or material elements of their respective conventional habitats, conditions, or environments. For a purpose of graphical clarity, in the images 210 and 220 such elements are not shown.

Herein, the method 100 is discussed referring to the reference and query images depicting a single object (reference images 220) or a single target (query image 210). In alternate embodiments, reference and query images depicting several such objects or targets may similarly be compared using processing steps of the method 100.

In the depicted exemplary embodiment, the query and reference images 210, 220 are digitized 2D images having the same digital resolution (i.e., number of pixels per unit of area), and their graphical contents (i.e., target 215 and objects 225) have approximately the same physical dimensions, or scale factors.

Generally, at least a portion of these properties in available samples of query and reference images may differ from one another or at least one of the query and reference images 210, 220 may be a portion of a larger image plane. At step 110, respective properties of such query and reference images are normalized.

In particular, a normalization process may adjust scale factors or digital resolution of the query or reference images, equalize or approximately equalize physical dimensions of particular elements in the images or the images themselves, produce copies of the query and reference images having different digital resolutions, and the like. Such normalization of the images increases probability and reduces computational complexity of recognizing the target 215 in graphical contents of the reference images 220.

At step 110, referring to FIG. 3, a similarity matrix 300 of the reference images 220 is generated. Matrix elements $S_{ij}$ of similarity matrix 300 are defined as similarity scores between reference images $220_i$ and $220_j$, where i and j are integers less than M. In similarity matrix 300, the similarity score of each reference image 220 versus itself (i.e., image $220_{ij}$ where i=j) forms a diagonal matrix element, and similarity scores of the reference images 220 one versus another form non-diagonal matrix elements.

Diagonal matrix elements (i.e., matrix elements $S_{ij}$ where i=j) relate to similarity scores of the respective reference images versus themselves and, as such, are unity matrix elements (i.e., matrix elements which numerical value is equal to 1). Correspondingly, since similarity scores $S_{ij}$ and $S_{ji}$ for the respective reference image $220_{ij}$ and $220_{ji}$ are equal to one another, the similarity matrix 300 is a symmetric matrix. Numerical value of the non-diagonal matrix elements is disposed in a range from 0 to 1.

A similarity score between reference images $220_i$ and $220_j$ is defined as a complement to a pictorial edit distance (PED), which is asserted as a weighted sum of a 2D representation of Insertion, Deletion, and Substitution Error terms of the Levenshtein algorithm for matching or searching one-dimensional data strings. Techniques for determining PEDs and similarity scores are disclosed in detail in commonly assigned U.S. patent application Ser. No. 11/61,913, filed on Jan. 2, 2007, and Ser. No. 11/619,092, filed on Jan. 2, 2007, which are herein incorporated by reference. Techniques for determining PEDs and similarity scores and comparing images using these properties are further disclosed in the commonly assigned U.S. patent applications by C. Podilchuk entitled "Method and System for Comparing Images Using a Pictorial Edit Distance," Ser. No. 11/947,726 filed Nov. 29, 2007, and "Method and System for Searching Multimedia Content," Ser. No. 11/947,734 filed Nov. 29, 2007, which are incorporated herein by reference in their entirety. Salient features of these techniques are briefly discussed below.

To determine the similarity score between reference image $220_i$ and $220_j$, an image disparity map is calculated for these images using a respective block matching algorithm. Using cost functions such as, for example, a mean absolute difference (or L1 error) or a mean square error (or L2 error), the image disparity map identifies disparity between pre-selected elementary blocks of pixels in the reference image $220_i$ and $220_j$ as a weighted sum of the one-to-many, one-to-none, and matching error correspondences between the blocks of pixels.

These types of correspondences are expressed in terms of the Levenshtein algorithm as follows: (i) one-to-many correspondence between the elementary blocks is asserted as an equivalent of an Insertion term, (ii) one-to-none correspondence between the elementary blocks is asserted as an equivalent of a Deletion term, (iii) partial matching between the elementary blocks is asserted as an equivalent of a Substitution Error term, and (iv) a PED between the compared images is asserted as an equivalent of the Levenshtein's Edit Distance.

The term "one-to-many correspondence" relates to an elementary block matching, with a cost function smaller than a first pre-determined threshold Q1, two or more elementary blocks of the other image. Accordingly, the term "one-to-none correspondence" relates to an elementary block having no match among the elementary blocks of the other image (i.e., elementary block which cost function, with respect to the elementary blocks of the other image, is greater than a second pre-determined threshold Q2). The term "partial matching" relates to the elementary blocks which cost functions, with respect to the elementary blocks of the other image, are disposed between Q1 and Q2, i.e., $Q1 \leq Q \leq Q2$.

At step 120, an initial reference image $220_k$ is selected. Reference image $220_k$ may be a randomly selected image or an image having certain common features with the query image 210, for example, an object matching algorithm may be used to match target 215 in query image 210 with a reference image $220_k$ containing a similar target $225_k$.

At step 130, a similarity score between the query image 210 and one of the reference images 220 (for example, similarity score $S_{qk}$ between the query image 210 and a reference image $220_k$, where k is an integer and $k \leq M$) is calculated.

At step 140, the method 100 determines if reference image $220_k$ is a match for query image 210 by comparing similarity score $S_{qk}$ with a pre-selected threshold T. If similarity score $S_{qk}$ exceeds threshold T, it is determined that query image 210 matches reference image $220_k$, that is, the method 100 determines that the target 215 depicted in the query image 210 and the object $225_k$ depicted in the reference image $220_k$ are graphically identical and proceeds to step 145, where the reference image $220_k$ is recorded as a match for the query image 210. If the query of step 140 is negatively answered, the method 100 proceeds to step 150. In some embodiments, at step 140, reference image $220_k$ is excluded from further consideration.

At step 150 it is determined if there are more reference images to be compared with the query image. Matching may continue until a match is found, until all of the reference images have been compared with the query image, or until a pre-determined number of reference images have failed to match the query image. Likewise, the method may be stopped when a match is found, or may continue by matching the query image with a pre-determined number of reference images and selecting the reference image having the highest similarity score with the query image as the match.

At step 160, the method 100 selects the next reference image by comparing the similarity score $S_{qk}$ between query image 210 and reference image $220_k$ with similarity scores between rejected reference image $220_k$ and other reference images 220 and selecting the reference image having a similarity score closest to the similarity score between the query image and the rejected image $220_k$ (i.e., $S_{qk}$). This reference image then becomes the current reference image 220 for comparing with the query image 210.

The similarity scores between reference image $220_k$ and other reference images 220 are defined by matrix elements of the respective row or column of the similarity matrix 300 that include the preceding reference image (e.g., matrix elements $S_{ik}$ or $S_{kj}$ in the row $302_k$ (matrix elements $S_{ik}$) or column $304_k$ (matrix elements $S_{kj}$)). Preferably, the next reference image 220 is the reference image that, with the preceding reference image 220, has the closest similarity score in such a row or column (i.e., "k" row or "k" column) of the similarity matrix 300. Method 100 then returns to box 130, using the next selected reference image 220.

In an alternate embodiment, reference images 220, having similarity scores with the preceding reference image (e.g., reference image $220_k$) are greater or smaller than respective pre-set thresholds, may be excluded from further consideration.

In particular, in case of the reference image $220_k$, the method 100 identifies an image $220_x$ having a similarity score in row $302_k$ or column $304_k$ which contains the closest similarity score $S_{kx}$ or $S_{xk}$ to the similarity score between query image 210 and the previous reference image $220_k$. The method 100 then calculates a similarity score between query image 210 and the identified reference image $220_x$.

Referring to FIG. 3, illustratively, a matrix element $S_{2k}$ in row $302_k$ provides the best match (shown with an arrow 301) with the similarity score $S_{qk}$, and step 160 calculates a similarity score $S_{q2}$ between the query image 210 and a reference image $220_2$ (shown with an arrow 303). Matrix elements $S_{1k}$ and $S_{Lk}$, illustratively, differ from the similarity score $S_{qk}$ by more than a certain pre-selected value, and, in some embodiments, the corresponding reference images $220_1$ and $220_L$ may be excluded from further consideration (shown with an arrows 305 and 307, respectively). Since the similarity matrix 300 is a symmetrical matrix, the same considerations apply to the matrix elements $S_{2k}$ and $S_{k2}$, $S_{1k}$ and $S_{k1}$, and $S_{Lk}$ and $S_{kL}$, respectively.

In alternate embodiments, the method is terminated after a pre-determined number of the reference images 220 (for example, one reference image), which similarity scores with the query image 210 are greater than the threshold T, is identified. Alternatively, all reference images of those compared with the query image which have a similarity score greater than threshold T may be recorded as matches. Step 170 then identifies the reference image 220 (or multiple reference images) having the highest similarity scores with the query image 210.

In exemplary embodiments, method 100 may be implemented in hardware, software, firmware, or any combination thereof in a form of a computer program product comprising computer-executable instructions. When implemented in software, the computer program product may be stored on or transmitted using a computer-readable medium adapted for storing the instructions or transferring the computer program product from one computer to another.

Figure 4:
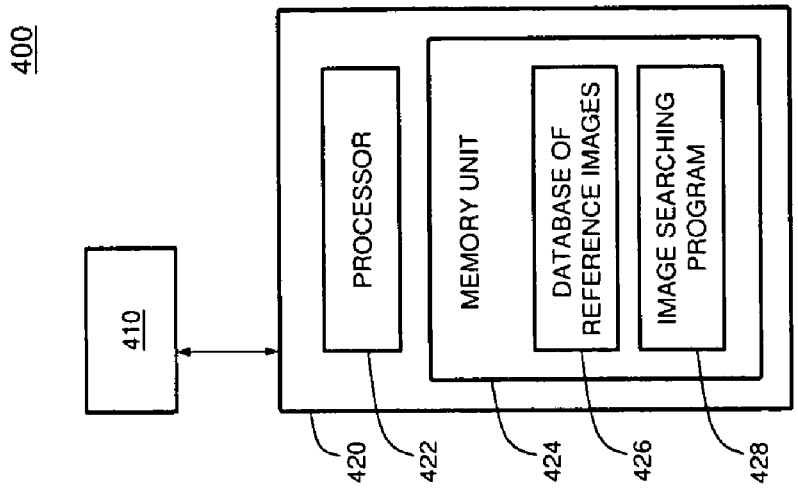
FIG. 4 is a high-level, schematic diagram of an exemplary system using the method of FIG. 1.

FIG. 4 is a high-level, schematic diagram of an exemplary system 400 using the method 100. The system 400 illustratively includes an analyzer 420 and a source 410 of one or more query images 210.

In one embodiment, the analyzer 420 is a computer having a processor 422 and a memory unit 424. The memory unit 424 includes a database 426 of reference images 220 and an image searching program, or software, 428. The image searching program 428 encodes, in a form of computer instructions, the method 100. When executed by the processor 422, the program 428 performs processing steps of the method 100. In an alternate embodiment, the database 426 may be a portion of a remote apparatus (not shown) coupled to the analyzer 420.

In alternate embodiments, at least some of the image searching program 428 and database 426 of reference images 220 may reside on a removable magnetic or optical media (e.g., flash memory card or drive, compact disc (CD), DVD, Blu-Ray and/or HD optical disks and the like) (not shown) or any other storage medium (not shown), including magnetic media such has hard disk drives, tapes, and the like, including media coupled to the computer 420 by way of a network (not shown), such as a wide area network (WAN), local area network (LAN) or the Internet. The source 410 is generally a digital video-recording device (for example, digital camera, digital video camera, and the like), an image-digitizing device (for example, a scanner), or a remote data storage adapted for communicating with the analyzer 420. In an alternate embodiment, the query image(s) 210 may be selected from images contained in the database 426 (i.e., from reference images 220).

Although the invention herein has been described with reference to particular illustrative embodiments, it is to be understood that these embodiments are merely illustrative of the principles and applications of the present invention. Therefore numerous modifications may be made to the illustrative embodiments and other arrangements may be devised without departing from the spirit and scope of the present invention, which is defined by the appended claims.

I claim:

1. A system comprising a computer having software running thereon for implementing a method for searching a database of graphical data, said data including a plurality of reference images, said software performing the steps of:
    (a) calculating a similarity score between a query image and a current selected reference image;
    (b) determining if a match between said query image and said current selected reference image is indicated;
    (c) selecting a second reference image having a similarity score with said current selected image that is closest to the calculated similarity score between said query image and said current selected image; and
    (d) repeating steps (a)-(c) using said second image as the current selected image until said method is terminated.

2. The system of claim 1 wherein a match between said query image and said current selected reference image is indicated when said calculated similarity score exceeds a pre-determined threshold.

3. The system of claim 2 wherein said method is terminated when match is found between said query image and a current selected reference image.

4. The system of claim 2 wherein said method is terminated when no matches are found between said query image a pre-determined number of current reference images.

5. The system of claim 2 wherein said method is terminated when a pre-determined number reference images have been selected and compared to said query image.

6. The system of claim 5 wherein said method discovers a plurality of matches further performing the step of:
   selecting, from said plurality of matches, the reference image having the highest similarity score between itself and said query image.

7. The system of claim 1 further comprising the step of pre-calculating similarity scores between all reference images prior to performing steps (a)-(d).

8. The system of claim 1 wherein said calculated similarity scores are based on a pictorial edit distance between the images being compared.

9. The system of claim 1 wherein said initial current selected reference image is selected randomly.

10. The system of claim 1 wherein said initial current selected reference image is selected based on a determination that said query image and said reference image contain like objects.

11. The system of claim 1 wherein similarity scores between all reference images are stored in a matrix and further wherein the next reference image is selected by identifying, in a row or a column intersecting a diagonal of said matrix at a position relating to the current reference image, the matrix element containing the similarity score that is closest to the similarity score between the query image and the current selected reference image, and selecting the reference image corresponding to that matrix element as the next current reference image.

12. The system of claim 1 wherein reference images which have previously been determined to not match the query image are excluded from further consideration.

13. The system of claim 1 further performing the step of normalizing said query image to match at least one of a digital resolution or a scale factor of the query image with a digital resolution or a scale factor of the reference images.

14. The system of claim 1 wherein only a portion of said query image is used to generate similarity scores with said selected reference images.

15. The system of claim 14 wherein said portion of said query image used to generate said similarity scores contains an identified object.

16. The system of claim 15 wherein said portion of said query image containing an identified object is normalized to match at least one of a digital resolution or a scale factor between said portion of said query image with a digital resolution or a scale factor of the reference images.

17. The system of claim 15 wherein said query image contains multiple identified objects and further wherein multiple portions of said query image are used to generate said similarity scores.

18. The system of claim 8 wherein said pictorial edit distances are calculated by identifying disparities between pre-selected elementary blocks of pixels in said query image and said reference images as a weighted sum of the one-to-many, one-to-none and matching error correspondences between said blocks of pixels.

19. The system of claim 18 wherein said similarity scores are calculated as the mathematical complements of said pictorial edit distances.

* * * * *